Reissued June 3, 1947 Re. 22,887

UNITED STATES PATENT OFFICE 22,887

PROCESS FOR REMOVING OXIDE FROM THE SURFACE OF METALS

Harry R. Spence and Horace W. Hooker, Lewiston, N. Y., assignors to Hooker Electrochemical Company, Niagara Falls, N. Y., a corporation of New York No Drawing. Original No. 2,395,694, dated February 26, 1946, Serial No. 538,538, June 2, 1944. Application for reissue January 16, 1947, Serial No. 722,470

13 Claims. (Cl. 134—2)

Our invention relates more particularly to processes for removing oxide from the surface of metals, and especially the ferrous metals, also copper, and their alloys, which have been or are in the process of being rolled out into sheets or drawn into tubes, wires or other shapes, at more or less elevated temperature. This work generally involves heating the metal and passing it several times through the rolls, at temperatures sufficiently elevated to soften the metal. At these temperatures metal picks up oxygen from the air and forms the dark oxide. Ordinarily, this oxide readily scales off, but in the course of the working above described, the metal becomes toughened and hardened and the oxide film rolled into it until, in the case of ferrous metals and their alloys, it may form a dense coal black glaze. There may also be several finishing passes through dies at lower temperatures such as result from the work of friction and deformation. For this purpose it is necessary to remove the glaze and at intervals also to anneal the metal, in order to proceed.

Removal of the glaze is difficult, especially in the case of the alloy steels. Annealing after removal of the glaze reoxidizes the metal.

Among the ferrous metals that may be treated by our process, besides iron, are the other metals of the ferrous group, including nickel and cobalt, and their alloys with each other and with chromium, manganese, molybdenum, tungsten, vanadium and copper, including the stainless steels containing nickel and chromium and alloys of nickel with chromium, such as "Nichrome" and "Tophet," which may contain little or no iron, also alloys of nickel with copper, such as "Monel," which contains no iron.

Two methods in general have been used or proposed for removing oxide from the surface of such metals and alloys, namely:

(A) The oxide may be removed by the purely chemical action of an aqueous acid, converting it into a soluble salt. This leaves the surface bright, but as the metal itself is also attacked by the acid, there is an appreciable loss of metal and the surface is left pitted. Moreover, the time required for the operation is excessive, e. g., several hours.

(B) The oxide may be reduced to the metallic state. This is done by cathodic electrolysis, generally in an electrolyte of fused alkali, in which the metal serves as cathode. The reduced oxide may form a sponge layer on the surface of the metal, or it may fall off into the electrolyte, where it accumulates as sludge. This process is open to the objection that it is very difficult to secure uniform distribution of the current over the surface of the metal because of electrical resistance at the contacts, and especially through the oxide, and unequal distances from the anode of the various parts of the metal pieces undergoing treatment. This is particularly true when the metal is in the form of shaped articles, such as stampings, coils of wire or tubes having recesses or interior surfaces. The difficulty of current distribution is especially great in the case of alloy steels, particularly those containing nickel or chromium or both, owing to high electrical resistance of these alloys and variations in their oxides. Non-uniform current distribution tends to localize the electrolytic action.

On this account it has sometimes been found advantageous to subject the metal to a brief anodic treatment prior to the cathodic treatment. The effect of this treatment may be increased by the addition of a substantial proportion of a chloride such as sodium chloride to the fused bath. A typical treatment of this nature would be an anodic oxidation of 30 seconds followed by a cathodic reduction of 2 minutes, in a bath of fused caustic soda containing 20 per cent sodium chloride, at 500° to 550° C. and a current density of 100 to 150 amperes per square foot of surface of the metal under treatment. In the case of stainless steel, and in particular that containing 18 per cent chromium and 8 per cent nickel, known as "18–8" stainless steel, this treatment leaves the surface in a rough condition, due to adherence of the metal left by reduction of the oxide. Such a surface is objectionable from the point of view of appearance and also in that it renders further rolling or drawing difficult. In order to remove this rough coating it is sometimes necessary to immerse the metal in a strong acid, such as aqua regia, for several minutes.

This drastic acid treatment gives the metal a brilliant sheen, but under the microscope the surface is seen to be pitted, due to chemical attack on the metal itself.

We have now found that after the above described anodic treatment a soaking in the fused caustic bath, at oxidizing, or substantially the same electrical potential with respect to the metal, i. e., without application of electric current, changes the character of the oxide so that it may be removed by a wash and quick dip in a dilute non-oxidizing acid, without any injury of the metal surface. Although this involves a somewhat longer time cycle than the process employing cathodic reduction, it is simpler and eliminates the harmful drastic acid treatment. Even without the anodic treatment or any electrolysis at all, a soaking in the fused caustic bath changes the character of the oxide so that much of it may be removed by acid without injury to the underlying metal surface. However, the removal of oxide is promoted by the anodic treatment.

We have also found that an effect equal or superior to that of the anodic treatment may be secured by subjecting the metal to the action of an anhydrous oxidizing agent that is effective without electrolytic decomposition, such as an alkali metal or alkaline earth nitrate, chlorate, peroxide, dichromate, manganate, or permanganate, without any electrolysis. The oxidizing agent may be added to the fused bath. Thus the oxidation and caustic soaking steps become simultaneous and a single operation.

In its preferred embodiment, therefore, our process consists in soaking the article in a bath of fused caustic alkali containing 1 to 20 per cent, and preferably 5 to 10 per cent, of an active oxidizing agent, at a temperature between 300° and 600° C. and generally between 400° and 600° C., and preferably at about 500° C. depending upon the oxidizing agent, for 1 to 20 minutes, the time depending on the caustic alkali and oxidizing agent used and upon the proportion of oxidizing agent in the bath, and then dipping it briefly, e. g. for 15 to 60 seconds, in a dilute non-oxidizing acid, such as 1 to 20 per cent hydrochloric acid, preferably at 65° to 85° C. It is desirable to wash off excess caustic alkali before the acid dip. A convenient way of doing this is to quench the metal in water as it comes from the fused bath. When this is done, much of the oxide is found as a sludge in the water; also there is less consumption of acid. The electrolytic treatment, with all its difficulties of current distribution, is thereby completely eliminated.

Our treatment changes the physical character of the oxide so that the glaze is puffed out into a coating of fine grain, which may resemble lamp black. In some cases, however, the coating is brown and if the treatment is continued the brown oxide eventually becomes so puffed out and loosened that some of it may be shaken off. The resulting powder is of the fineness of paint pigment. The extreme fineness of this oxide probably accounts for the readiness with which it is attacked by the dilute acid. The removal of this oxide by the acid dip leaves a frosted or mat surface, of the kind that is preferred for further drawing, and of a color from steel grey to silvery white, depending on the nature of the steel.

When the metal is stainless steel we have found that after use the bath contains sodium chromate in solution. This might be thought to indicate that the chromium is oxidized, the oxide forming with the caustic soda the sodium salt of chromium, which then dissolves off in the bath.

Our fused alkali bath may consist of caustic soda, caustic potash or a mixture of these alkalies with each other or with their carbonates or caustic lime. The presence of the oxidizing agent lowers the melting point of the bath. Thus, 10 per cent of sodium nitrate lowers the melting point of caustic potash from 360° to 315° C. Also, by proper proportioning of a mixture of alkalies, it is possible to produce a bath of substantially lower melting point than that of any one of its individual components. Thus a mixture of commercial caustic soda and caustic potash in equal proportions by weight melts at 205° C., whereas these alkalies, in commercial grades, melt at 325° and 360° C., respectively. Such a low melting bath will have in higher degree the property of wetting or soaking into the oxide and by using one of the more active oxidizing agents, such as the alkali metal and alkaline earth chlorates, may be operated at a lower temperature than a bath of a single caustic alkali. Naturally the favorable proportions for such mixture include their eutectics.

Our process therefore effects not only a great simplification and substantial cheapening of the operation, as compared with earlier processes involving one or more electrolytic treatments, including a final cathodic reduction followed by a drastic treatment with strong acid, but also a substantial improvement in the result.

We have also found that when further drawing through dies at lower temperatures is required, the coating produced by our process need not be removed until after the final drawing. In that case, it serves as a very effective base for the lubricant for the dies during the next four or five successive operations, perhaps because the particles of oxide are so fine that they roll. This makes it possible to dispense with the lead coating generally applied for lubrication purposes. After the final working the metal is given the quick acid dip, which leaves it with the frosted surface above described.

Although we prefer to add the oxidizing agent to the fused caustic alkali bath, it may, if preferred, be used by itself in a separate step preliminary to the treatment in the fused caustic alkali bath. In this case the choice of oxidizing agents is increased.

*Example I*

A draw rod of "18–8" stainless steel having a dark glazed surface was immersed for 4 minutes in a bath of fused caustic soda containing 10 per cent sodium nitrate by weight at 575° C. When removed the surface coating had been converted to a condition resembling lamp black. A water wash and dip of 30 seconds in dilute hydrochloric acid removed the oxide completely, leaving a clean frosted silvery grey surface.

*Example II*

A piece of the same rod as that of Example I was treated in the same way except that the temperature was 500° C. and the time 5 minutes. The result was substantially the same. This at present represents preferred practice.

*Example III*

A piece of the same rod as that of Example I was treated in the same way except that the temperature was 420° C. and the time 15 minutes. The result was substantially the same. A comparison of this example with the two preceding shows that the time of treatment in our process is a function of the temperature of the bath.

*Example IV*

Another piece of the same rod was immersed for 10 minutes in a fused bath of caustic soda and caustic potash in equal proportions by weight containing 10 per cent sodium nitrate at 400° C. The rod came out resembling those of Examples I to III. The water wash and acid dip left the surface clean of oxide but not so bright as in the previous examples, which may have been due to the slightly lower temperature.

*Example V*

Another piece of the same rod was immersed for 25 minutes in a fused bath of caustic soda and caustic potash in equal proportions by weight containing 10 per cent sodium chlorate at 300° C. It came out with the oxide converted to a coating resembling reddish brown paint pigment. A water wash and acid dip of one minute removed the brown coating, leaving a clean frosted surface.

*Example VI*

Another piece of the same rod as that treated in Example I was immersed in a bath of fused caustic potash containing 10 per cent sodium nitrate by weight for 4 minutes at 420° C. It came out with the oxide converted to a brown coating resembling that of Example V. The water wash and acid dip removed this, leaving a clean frosted surface, though not quite so bright as that of Example I, probably due to the time not having been quite long enough.

*Example VII*

Another piece of the same rod was immersed for 6 minutes in a bath of fused caustic potash containing 10 per cent of potassium chlorate by weight at 420° C. It came out with the oxide converted to a condition resembling that of Example V. The water wash and acid dip left the surface frosted and silvery white, brighter than in any of the preceding examples, showing that the chlorates are very effective oxidizing agents for the purpose of our process.

*Example VIII*

Another piece of the same rod was immersed in a fused bath of caustic soda and caustic potash in equal proportions by weight, without any oxidizing agent, at 400° C., for 10 minutes. It came out a very dark brown in color. The wash and acid dip removed a part but not all of the oxide, showing that in the absence of the oxidizing agent the effect is less positive.

*Example IX*

Another piece of the same rod was immersed in a bath of fused sodium nitrate alone for 6 minutes and given a water wash and acid dip. It was little affected. This is believed to show that the caustic alkali is essential.

*Example X*

Another piece of the same rod was immersed for 5 minutes in fused sodium nitrate, then for 5 minutes in a bath of fused caustic soda at 415° C., followed by a water wash and dip in dilute acid. The result was similar to that of Example III, showing that the treatments with oxidizing agent and caustic soda may be simultaneous or successive.

*Example XI*

A strip of rolled low carbon steel having a glossy black surface was immersed for 10 minutes in a bath of fused caustic soda containing 6½ per cent sodium nitrate by weight at about 400° C. and withdrawn. The oxide had been converted to a condition resembling paint pigment, so intensely black that it made the original surface seem grey by comparison. A water wash and acid dip removed the coating, leaving the surface a natural steel grey color.

*Example XII*

A badly rusted cast-iron pipe elbow was treated as in Example XI. It came out with the lamp black like coating. After the wash and acid dip it was the grey color of clean cast iron.

*Example XIII*

A piece of old badly rusted steel pipe was treated as in Example XI with the same result.

*Example XIV*

A strip of "Nichrome" containing 80 per cent nickel and 20 per cent chromium and no iron, heavily coated with dark oxide, was immersed in the same bath as in Example III for the same time and at the same temperature. It came out with a reddish brown irridescent coating which was completely removed by the water wash and acid dip, leaving a beautiful shiny surface.

*Example XV*

A sheet of "Monel" coated with dark oxide was immersed in a fused bath of caustic soda containing 6½ per cent sodium nitrate at 500° C. for 5 minutes. It came out with the oxide converted to a coating resembling lamp black. It was quenched in water and immersed in warm 10 per cent hydrochloric acid for one minute. The surface was left a beautiful silvery white.

*Example XVI*

Pieces of cast and stamped copper heavily coated with a mottled reddish brown oxide were treated as in Example III. They came out quite black. After the wash and acid dip their surfaces were immaculately clean, that of the casting appearing frosted.

Although we have emphasized treatment of alloy steels, that is only because they present the greatest difficulty. A large field of application is of course that of ordinary low or high carbon steels. The foregoing examples show that our process is also applicable to copper and, in general, to any metal or alloy that is resistant to caustic alkalies under the conditions of treatment, and preferably up to at least 600° C. Our process is applicable to castings as well as to articles formed from the malleable metal by stamping, rolling, drawing, etc. It is also applicable to articles that have become oxidized at low temperature, as by atmospheric oxidation.

Although in the foregoing specification and examples we have indicated that the acid should be non-oxidizing and have used only dilute hydrochloric acid as an illustration of such an acid, we do not wish to be limited thereto. Other acids, including nitric and sulphuric acid, which are ordinarily considered as oxidizing acids, may be used if in such dilution and at such a temperature that they do not have an oxidizing effect or otherwise attack the metal.

While we do not wish to be held to any particular theory as to the reactions that take place in our process, it would seem that the fused caustic alkalies form the corresponding salts of the metal oxides, which are generally black but sometimes a very distinctive reddish brown, and that these salts being basic as well as quasi-molecular, are very reactive with acids. It appears that the presence of the oxidizing agent promotes formation of these salts and any preliminary reduction, as by cathodic electrolysis, hinders their formation. The presence of any considerable quantity of water would prevent the necessary temperature from being reached and perhaps operate adversely in other ways.

This application is for a re-issue of application

Serial No. 538,538, filed June 2, 1944, now Patent No. 2,395,694.

We claim as our invention:

1. The method of removing from the surface of metals resistant to fused caustic alkalies dense firmly adherent oxide that has formed thereon through exposure to air under oxidizing conditions which comprises subjecting the oxide to the action of a fused substantially anhydrous bath, comprising caustic alkali containing a substantial but minor proportion of an oxidizing agent stable therewith, said bath being at substantially the same electrical potential as the metal, at a temperature of 300° to 600° C., for not less than 1 minute, and then subjecting the modified oxide to the action of a weak aqueous inorganic acid.

2. The method of removing from the surface of metals that have been treated by the process of claim 1 oxide that has formed thereon through subsequent exposure to air at annealing temperature which comprises subjecting the oxide to the action of a fused substantially anhydrous bath comprising caustic alkali containing a substantial but minor proportion of an oxidizing agent stable therewith, at a temperature of 300° to 600° C., and then subjecting the oxide to the action of a weak inorganic acid.

3. The method of removing from the surface of metals resistant to fused caustic alkalies dense firmly adherent oxide that has formed thereon through exposure to air under oxidizing conditions which comprises subjecting the oxide to the action of a fused substantially anhydrous bath, comprising at least one caustic alkali of the group consisting of sodium and potassium hydroxides and 1–20% of at least one oxidizing agent of the group consisting of the alkali metal and alkaline earth chlorates, peroxides, nitrates, dichromates, manganates, and permanganates, said bath being at substantially the same electrical potential as the metal, at a temperature of 300° to 600° C., for not less than 1 minute, and then subjecting the modified oxide to the action of a weak aqueous inorganic acid.

4. The method of removing from the surface of metals of the group consisting of iron, nickel and cobalt and their alloys with each other and with chromium, manganese, molybdenum, tungsten, vanadium and copper, dense firmly adherent oxide that has formed thereon through exposure to air under oxidizing conditions which comprises subjecting the oxide to the action of a fused substantially anhydrous bath, comprising caustic alkali containing a substantial but minor proportion of an oxidizing agent stable therewith, said bath being at substantially the same electrical potential as the metal, at a temperature of 300° to 600° C., for not less than 1 minute, and then subjecting the modified oxide to the action of a weak aqueous inorganic acid.

5. The method of removing from the surface of chrome-nickel "stainless steel" dense firmly adherent oxide that has formed thereon through exposure to air under oxidizing conditions which comprises subjecting the oxide to the action of a fused substantially anhydrous bath, comprising caustic soda containing 5 to 15 per cent sodium nitrate, said bath being at substantially the same electrical potential as the metal, at 400° to 600° C., for not less than 1 minute, and subjecting the modified oxide to the action of 5 to 15 per cent aqueous hydrochloric acid.

6. The method of removing from the surface of chrome-nickel "stainless steel" dense firmly adherent oxide that has formed thereon through exposure to air under oxidizing conditions which comprises subjecting the oxide to the action of a fused substantially anhydrous bath, comprising caustic soda containing 1–20% of sodium nitrate, said bath being at substantially the same electrical potential as the metal, at 400 to 600° C. for not less than 1 minute nor more than 20 minutes, and subjecting the modified oxide to the action of 1–20% of a dilute inorganic acid.

7. The method of removing from the surface of metals of the group consisting of iron, nickel and cobalt and their alloys with each other and with chromium, manganese, molybdenum, tungsten, vanadium and copper, dense firmly adherent oxide that has formed thereon through exposure to air under oxidizing conditions which comprises subjecting the oxide to the action of a fused substantially anhydrous bath comprising caustic alkali containing a substantial but minor proportion of an oxidizing agent stable therewith, said bath being at substantially the same electrical potential as the metal, at a temperature of 400° to 600° C., for not less than 1 minute, and then subjecting the modified oxide to the action of a dilute aqueous inorganic acid.

8. The method of removing from the surface of metals of the group consisting of iron, nickel and cobalt and their alloys with each other and with chromium, manganese, molybdenum, tungsten, vanadium and copper, dense firmly adherent oxide that has formed thereon through exposure to air under oxidizing conditions which comprises subjecting the oxide to the action of a fused substantially anhydrous bath, comprising at least one caustic alkali of the group consisting of sodium and potassium hydroxides and a substantial but minor proportion of at least one oxidizing agent of the group consisting of the alkali metal and alkaline earth chlorates, peroxides, nitrates, dichromates, manganates and permanganates, said bath being at substantially the same electrical potential as the metal, at a temperature of 400° to 600° C., for not less than 1 minute, and then subjecting the modified oxide to the action of a dilute aqueous inorganic acid.

9. The method of removing from the surface of metals of the group consisting of iron, nickel and cobalt and their alloys, with each other and with chromium, manganese, molybdenum, tungsten, vanadium and copper, dense firmly adherent oxide that has formed thereon through exposure to air under oxidizing conditions which comprises subjecting the oxide to the action of a fused substantially anhydrous bath, comprising at least one caustic alkali of the group consisting of sodium and potassium hydroxides and 1 to 20 per cent of at least one oxidizing agent of the group consisting of the alkali metal and alkaline earth chlorates, peroxides, nitrates, dichromates, manganates, and permanganates, said bath being at substantially the same electrical potential as the metal, at a temperature of 400° to 600° C., for not less than 1 minute, and then subjecting the modified oxide to the action of a weak aqueous inorganic acid.

10. The method of removing from the surface of metals of the group consisting of iron, nickel and cobalt and their alloys, with each other and with chromium, manganese, molybdenum, tungsten, vanadium and copper, dense firmly adherent oxide that has formed thereon through exposure to air under oxidizing conditions which comprises subjecting the oxide to the action of a fused substantially anhydrous bath comprising sodium hydroxide containing 1–20% of one or more oxidizing agents of the group sodium nitrate and potassium nitrate, said bath being at substantially the same electrical potential as the metal at a temperature of 400–600° C. for not less than one minute nor more than twenty minutes, and then subjecting the oxide to the action of a dilute inorganic acid of the group hydrochloric, sulphuric and nitric to remove oxide without material degradation of the underlying surface.

11. The method of removing from the surface of metals of the group consisting of iron, nickel and cobalt and their alloys, with each other and with chromium, manganese, molybdenum, tungsten, vanadium and copper, dense firmly adherent oxide that has formed thereon through exposure to air under oxidizing conditions which comprises subjecting the oxide to the action of a fused substantially anhydrous bath, comprising at least one caustic alkali of the group consisting of sodium and potassium hydroxide and 1–20% of at least one oxidizing agent of the group consisting of sodium and potassium nitrates at a temperature of 400–600° C. for not less than one minute nor more than twenty minutes, said bath being at substantially the same electrical potential as the metal, then subjecting the modified oxide to the action of a dilute aqueous inorganic acid of the group hydrochloric, sulphuric and nitric to remove oxide without material degradation of the underlying surface.

12. The method of removing from the surface of metals of the group consisting of iron, nickel and cobalt and their alloys with each other and with chromium, manganese, molybdenum, tungsten, vanadium and copper, dense firmly adherent oxide that has formed thereon through exposure to air under oxidizing conditions which comprises subjecting the oxide to the action of a fused substantially anhydrous bath, comprising sodium hydroxide containing 1–20% of at least one oxidizing agent of the group consisting of the alkali metal and alkaline earth nitrates at a temperature of 400–600° C. for not less than one minute nor more than twenty minutes, said bath being at substantially the same electrical potential as the metal, and then subjecting the modified oxide to the action of a dilute aqueous inorganic acid of the group hydrochloric, sulphuric and nitric to remove oxide without material degradation of the underlying surface.

13. The method of removing from the surface of metals of the group consisting of iron, nickel and cobalt and their alloys, with each other and with chromium, manganese, molybdenum, tungsten, vanadium and copper, dense firmly adherent oxide that has formed thereon through exposure to air under oxidizing conditions which comprises subjecting the oxide to the action of a fused substantially anhydrous bath comprising caustic alkali containing 1–20% of an oxidizing agent stable therewith, said bath being at substantially the same electrical potential as the metal, at a temperature of over 400° C. for not less than one minute nor more than twenty minutes, and then subjecting the oxide to a subsequent acid bath to remove the oxide without material degradation of the underlying surface.

HARRY R. SPENCE.
HORACE W. HOOKER.

REFERENCES CITED

The following references are of record in the file of this patent:

UNITED STATES PATENTS

| Number | Name | Date |
|---|---|---|
| 1,565,420 | Cornell | Dec. 15, 1925 |
| 2,347,742 | Keene | May 2, 1944 |
| 1,978,151 | Mater | Oct. 23, 1934 |
| 2,330,608 | Nachtman | Sept. 28, 1943 |
| 1,572,840 | Porter | Feb. 9, 1926 |
| 1,899,734 | Stockton | Feb. 28, 1933 |
| 1,989,884 | Reinhardt | Feb. 5, 1935 |
| 2,261,744 | Ostrofsky | Nov. 4, 1941 |
| 2,311,139 | Tainton | Feb. 16, 1943 |
| 1,247,086 | Crowe | Nov. 20, 1917 |
| 1,717,869 | Blumenthal | June 18, 1929 |

FOREIGN PATENTS

| Number | Country | Date |
|---|---|---|
| 228,278 | Great Britain | Feb. 5, 1925 |
| 466,661 | Great Britain | May 26, 1937 |